United States Patent
Evans et al.

[15] 3,660,910
[45] May 9, 1972

[54] APPARATUS FOR HEATING AND DRYING CHILLED, FILLED CONTAINERS

[72] Inventors: Grover C. Evans; Thomas J. Evans, both of Little Rock, Ark.

[73] Assignee: G. C. Evans Products Corporation, Little Rock, Ark.

[22] Filed: Oct. 21, 1970

[21] Appl. No.: 82,711

[52] U.S. Cl. .................................. 34/60, 15/302, 34/219, 134/72, 134/108
[51] Int. Cl. ................................................. B08b 3/00
[58] Field of Search ........................... 34/9, 60, 61, 219, 236; 134/70, 71, 72, 106–108; 15/300, 302

[56] References Cited

UNITED STATES PATENTS

| | | | |
|---|---|---|---|
| 1,406,465 | 2/1922 | Lynch | 134/72 |
| 1,780,772 | 11/1930 | Washburne | 134/72 |
| 3,267,943 | 8/1966 | Kuhl et al. | 134/72 |

*Primary Examiner*—Charles Sukalo
*Assistant Examiner*—Harry B. Ramey
*Attorney*—Davis, Lucas, Brewer & Brugman

[57] ABSTRACT

Apparatus for heating and drying chilled, filled containers such as bottles and cans. The apparatus comprises an enclosed housing with upper and lower compartments. Upper compartment has first, second, and third heat zones between loading and unloading zones A screen-type conveyor moves containers successively from the loading zone, through the heat zones, to the unloading zone. The containers are successively heated by: (a) overhead warm water spray in the first heat zone; (b) overhead hot water spray in the second heat zone; and (c) a combination of overhead and underneath hot water sprays in the third heat zone. Water collects in a tank in the lower compartment for re-use. Water is pumped direct from the tank and split into two streams: one stream being reheated and pumped to the second and third heat zones; the other stream being pumped, without reheating, to the first heat zone. An overhead blower directs air onto the containers in the loading zone; and the air is guided along the conveyor opposite to the direction of movement of the containers, and is recycled to the blower in a closed loop.

14 Claims, 9 Drawing Figures

INVENTORS
Grover C. Evans
Thomas J. Evans
BY
Davis, Lucas, Brewer & Brugman
ATTORNEYS

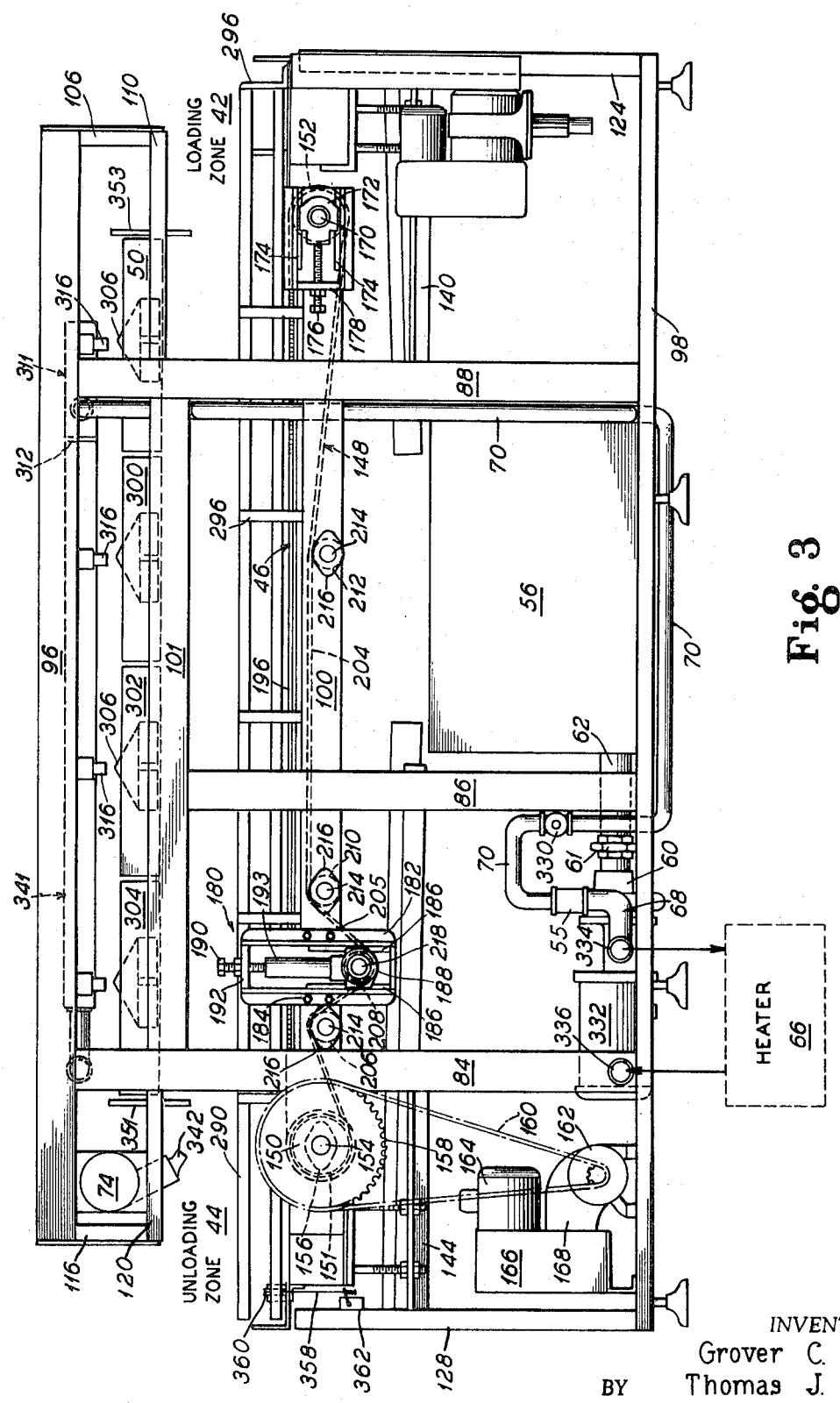

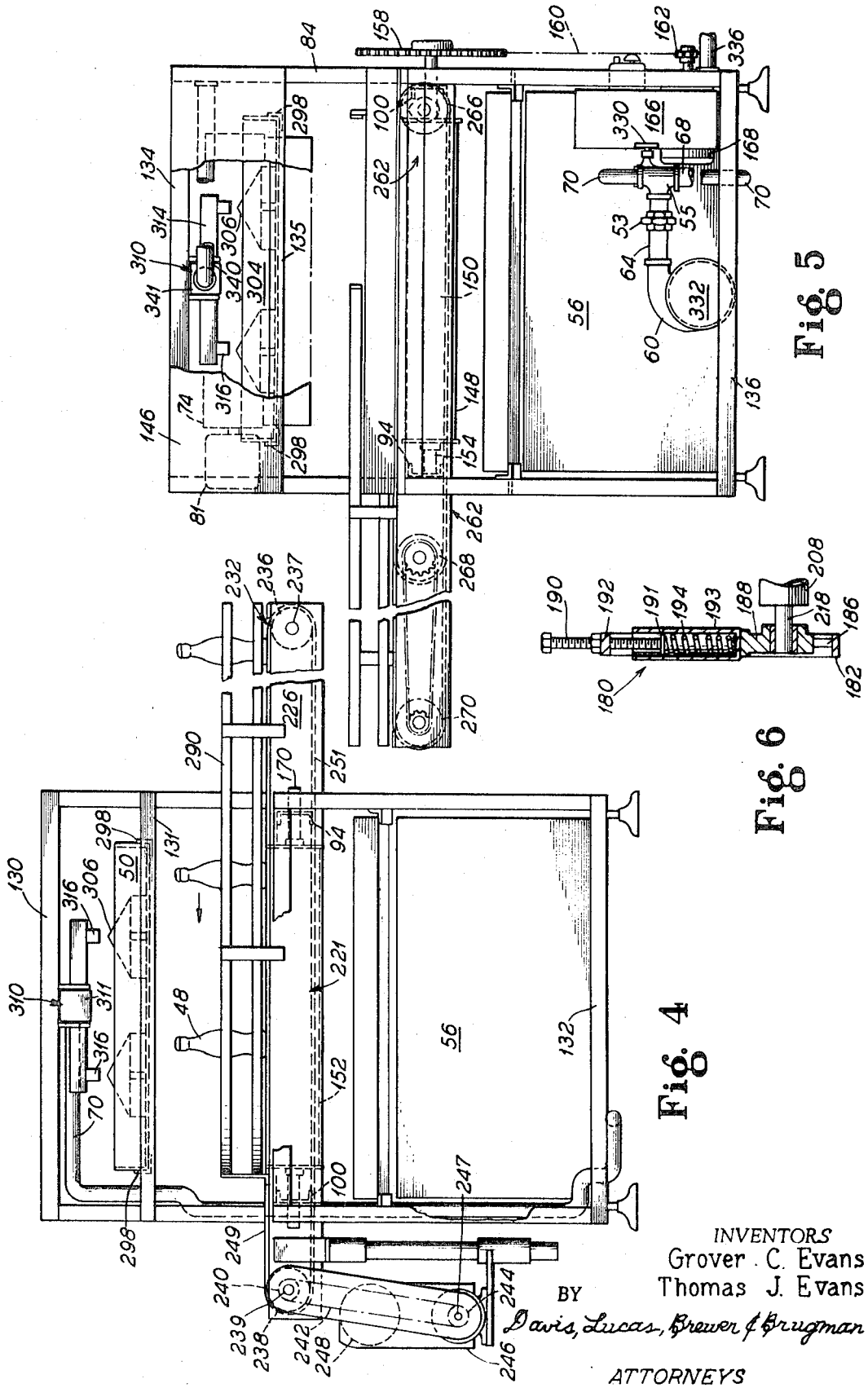

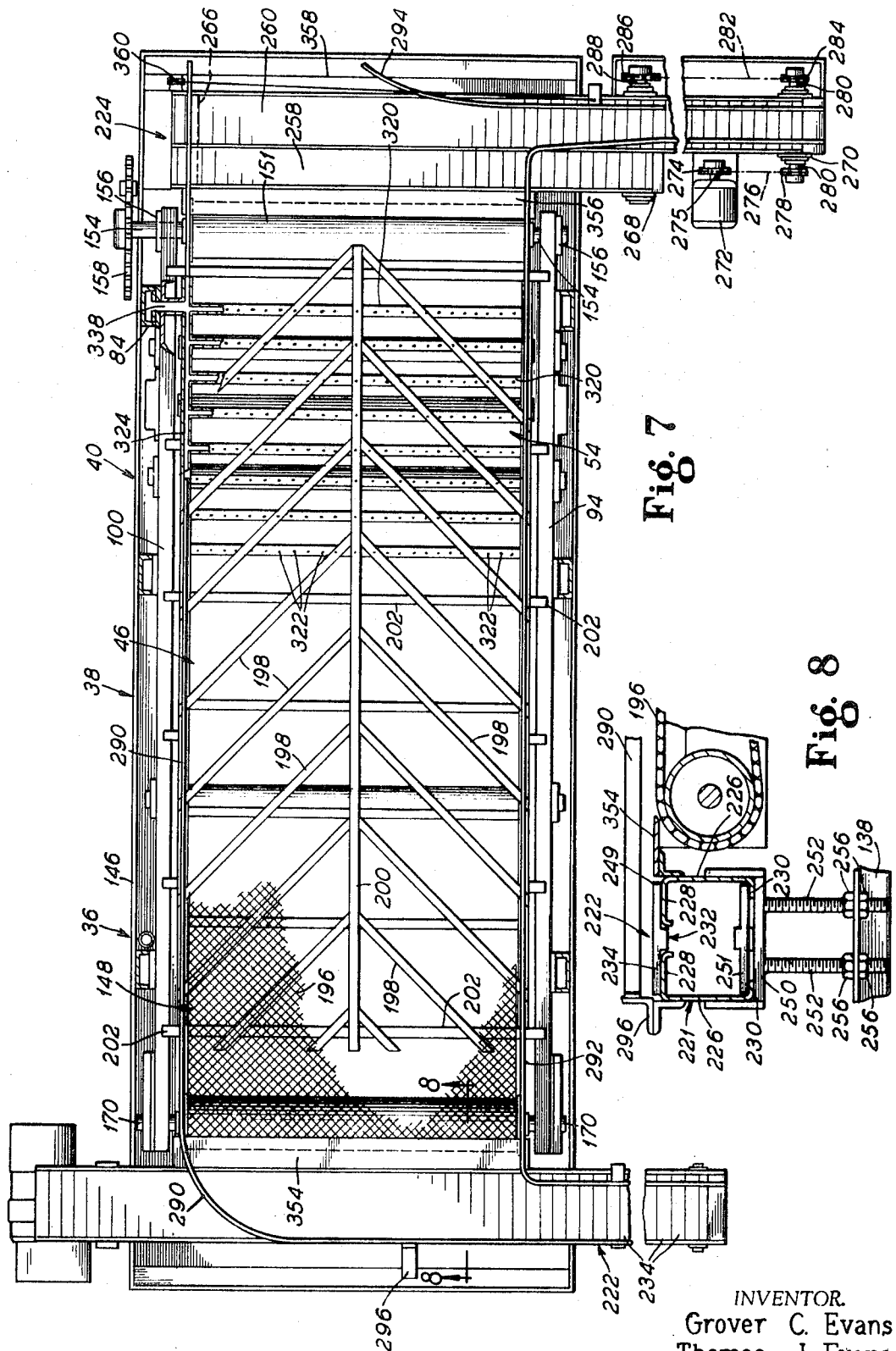

3,660,910

1

APPARATUS FOR HEATING AND DRYING CHILLED, FILLED CONTAINERS

BACKGROUND OF THE INVENTION

The field of this invention is, generally, apparatus for heating and drying by passing objects continuously through gas and liquid heating media, of the class generally associated with Patent Office Classification No. 134.

Carbonated beverages are normally bottled or canned at 38° to 40° F. Once this operation is complete, the containers are conveyed to a packaging operation where they are placed in cartons or cases. The filled, chilled containers will collect condensate on their exterior surfaces until their temperature rises to the dew-point. In humid summer weather, as much as eight ounces of water can readily collect in a 2-dozen carton before the temperature of the containers rises to the dew-point. This water of condensation causes the labels to loosen, and drips to the bottom of the carton making it soggy and weak, creating a very dangerous condition when the cartons are stacked. In practice, large stacks of cartons, or cases, have collapsed in warehouses.

Much effort has been devoted to finding ways of overcoming the effects of this water of condensation. Hot air, steam, hot water, and radiant electrical energy have been employed, to heat the filled containers above the dew-point of the air. None of these techniques have been widely accepted due to a variety of reasons, including high cost, large space requirements, or unreliability. A common complaint is inability to control or temper the heat where it is first applied to the cold containers. Another complaint is the inability to heat the containers gradually and uniformly above the dew-point. Poorly controlled heating equipment causes abrupt or localized temperature increases, resulting in sudden expansion of dissolved gases within the containers. This breaks bottles, deforms cans, causes cleanup problems, and is dangerous, costly, and inefficient.

SUMMARY OF THE INVENTION

A general object of the present invention is to provide apparatus which will economically and safely prevent water of condensation from collecting on chilled, filled containers such as bottles and cans.

A specific object is to provide such apparatus which will, effectively and safely, raise the temperature of chilled, filled containers above the dew-point in controlled, gradual steps, to avoid abrupt temperature increases which rupture bottles and distort cans.

Other objects and advantages will be apparent from the following description taken in connection with the drawings in which:

FIG. 3 is a side view of the same apparatus as seen from the opposite side;

FIG. 4 is a loading end view as seen in the direction of arrows 4—4 in FIG. 2;

FIG. 5 is an unloading end view as seen in the direction of arrows 5—5 in FIG. 2;

FIG. 6 is an enlarged, fragmentary cross-sectional view of FIG. 2, taken along line 6—6;

FIG. 7 is a horizontal cross-section of FIG. 2 taken along line 7—7;

FIG. 8 is an enlarged, vertical cross-section of FIG. 7 taken along line 8—8.

Like parts are referred to by like reference characters throughout the figures.

Figure 1:
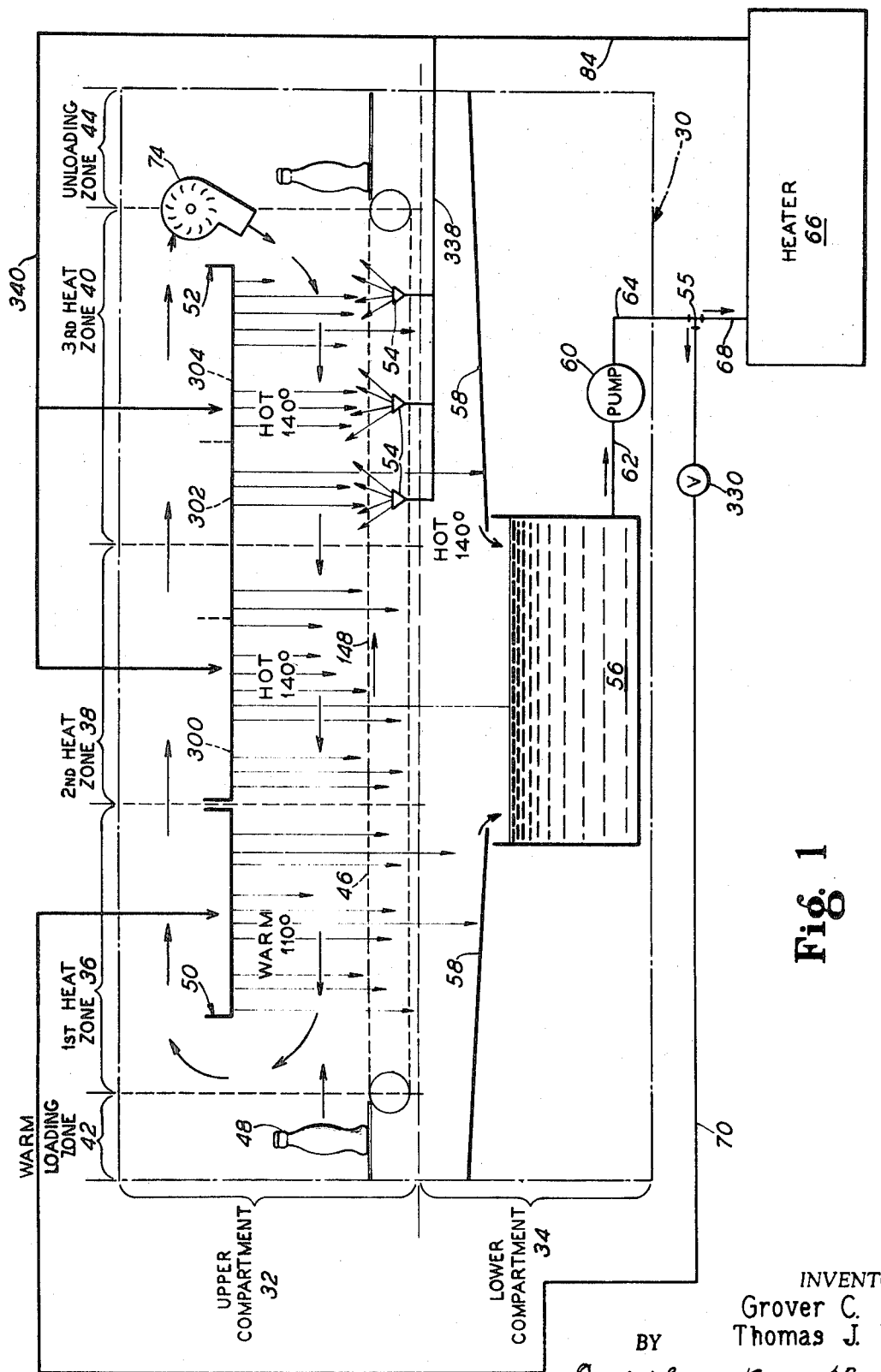
FIG. 1 is a flow sheet of the apparatus illustrated, showing its operation schematically.

Referring now to the preferred embodiment shown in the drawings, and particularly to the overall arrangement in the flow sheet, FIG. 1, the apparatus includes a housing or enclosure 30 having an upper compartment 32 and a lower compartment 34.

The upper compartment has a succession of first, second and third heat zones (36, 38, and 40, respectively) between loading and unloading zones 42 and 44, respectively.

A main, porous, screen conveyor 46 moves containers, such as the bottles 48, progressively from the loading zone 42, through heat zones 36, 38, 40, to the unloading zone 44.

Liquid dispensing means, comprising separate, apertured, overhead drip pan means 50 and 52, are located above the conveyor and they function, respectively, to rain warm and hot water onto the containers being treated. As will be explained, either drip pan means 50 or 52 may comprise one or more individual drip pans.

Upwardly directed sprays, generally designated 54, spray hot water up through the conveyor on the undersides of the containers in the third heat zone.

All the water sprayed onto the containers as they are conveyed through the housing drains or falls through the lower compartment into drain pans 58, 58 and tank 56.

A pump 60 has its inlet line 62 connected to tank 56, and has its outlet line 64 connected to the heater 66 via line 68, and to warm water dispensing pan means 50 via line 70.

Heater 66 supplies hot, reheated water to drip pan means 52 and undersprays 54 via lines 84, 338, and 340.

From the flow sheet, FIG. 1, it will be apparent that containers carried through the housing by the conveyor will be gradually heated in controlled steps without abrupt temperature increases. Warm, not hot, water at approximately 110° is rained down upon the cold containers in the first heat zone 36. Next, hot water at approximately 140° is rained upon the containers in the second heat zone. Finally, hot water is directed onto both the tops and the bottoms of the containers in the third heat zone 40.

A blower 74 is positioned overhead at the outbye end of the conveyor to direct a high velocity air stream onto the containers. This blows off droplets of water which may be clinging to the containers, and is particularly useful in removing pools of water retained by the upper rims of cans. The air follows a closed circuit, as shown by the arrows on the flow sheet. It flows, counter-current to the movement of the conveyor, through the hot and warm streams falling from the drip pan means 50 and 52, and returns in a closed loop to the blower through the longitudinal passage between the drip pans and the top of the housing.

The above apparatus will now be described in more detail in connection with FIGS. 2–9 which show one preferred embodiment of the actual hardware used.

Figure 2:
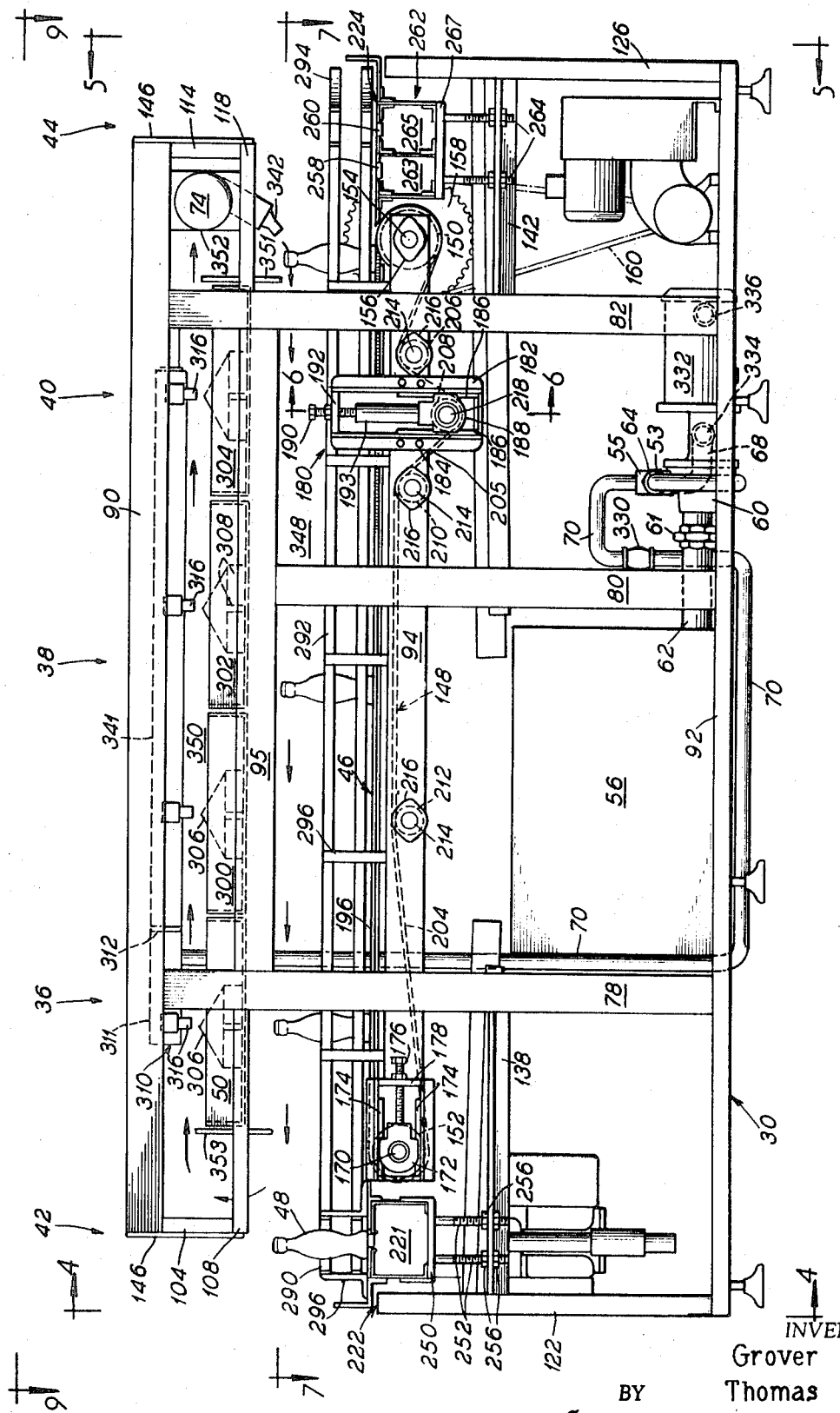
FIG. 2 is a side view of a preferred form of apparatus illustrating the present invention.

Refer first to the side views in FIGS. 2 and 3. The frame of housing 30 has six or more upright channel members 78, 80, 82, 84, 86, and 88. 80 and 86 are somewhat shorter than the others. Longitudinal stringer channels 90, 92, 94, and 95 extend along the side shown in FIG. 2, fastened to the uprights 78, 80, and 82. Similarly, along the other side, shown in FIG. 3, stringers 96, 98, and 100 and 101, are supported on uprights 84, 86, and 88.

In the loading zone 42, vertical struts 104 and 106 depend from the end portions of the upper stringers 90, 96, and support, in turn, the ends of horizontal struts 108 and 110. Similarly, in the unloading zone 44, struts 114 and 116 depend from the ends of the upper stringers and, in turn, support the ends of horizontal struts 118 and 120.

At the loading and unloading ends of the frames, respectively, relatively short upright posts 122, 124, and 126, 128, are fastened to the ends of the bottom longitudinal stringers 92, 98. The short upright posts just described are tied to adjacent main upright channels by horizontal angle members 138, 140 at the loading end, and 142, 144 at the unloading end.

The frame members described are supported cross-wise by transverse channels 130, 131 at the loading end, and 134, 135, 136 at the unloading end. Additional cross-pieces and braces may be employed as needed but will not be specifically described here.

For a pleasing commercial appearance, as well as to provide a sealed enclosure to retain heat and moisture, the frame members described will be covered externally with sheet metal, except where the loading and unloading conveyors extend into the housing. This sheet metal enclosure is not shown completely but is indicated by the numeral 146 (FIGS. 2 and 7). Doors (not shown) will be provided in the enclosure as needed to furnish access to the interior parts for maintenance, cleaning, or removal.

The main conveyor 46 is supported between the longitudinal stringers 94, 100. It comprises a conveying element 148 which is an endless, orbitally movable, foraminous belt. It is shown as an open-mesh, flexible metal screen, preferably stainless steel, and is trained for orbital movement between head and tail pulleys 150, 152, respectively.

As best shown in FIGS. 3 and 7, head pulley 150 is mounted on a drive shaft 154 which is journaled within bearings 156, 156, fastened to stringers 94 and 100. The drive shaft 154 has one end extending through the enclosure 146 (See FIG. 7). It has a sprocket 158 fastened to it. As shown in FIGS. 3 and 5, this is connected by a power transmission chain 160, driven by drive sprocket 162. A conveyor driving motor 164 drives the sprocket 162 at a selected speed, through the variable speed transmission 166 and gear box 168.

As shown in FIGS. 2 and 3, the tail pulley 152 is mounted on a shaft 170, each end of which is journaled in a bearing block 172 which is horizontally adjustable between slides 174, 174, by an adjustment screw 176. Each screw is threadedly engaged within a tapped bore in a mounting plate 178, fastened to the outside of one of the stringers 94, 100.

Automatic belt tensioning means 180 is shown in FIGS. 2, 3, and 6. This includes a vertical slide frame 182 fastened as by bolts 184, to each of the stringers 94, 100. Each slide frame has a pair of spaced, vertical guides 186, 186, between which a bearing block 188 is vertically slidable. Each slide frame has a vertical adjustment screw 190 threadedly engaged within a tapped bore in a top plate 192. As shown enlarged and cross-sectioned in FIG. 6, a coil spring 194 is compressibly interposed between an enlarged inner end 191 of each adjustment screw 190 and the corresponding bearing block 188. An upwardly open tube 193 is fastened to each block 188 to surround and guide the spring. Turning adjustment of the screws varies the compression in springs 194, thereby varying the normal operating tension in the conveyor belt 148.

Thus, between the slack adjustment screws 176, and the tension adjustment screws 190, a wide variation of adjustment in the belt slack and tension is available for all operating conditions.

As shown in FIG. 7, the upper, load-carrying run 196 of conveyor belt 148 is supported on a herringbone arrangement of diagonal metal slats 198, center slat 200, and underlying transverse slats 202. The ends of several slats 202 are supported on longitudinal stringers 94, 100.

The lower, return run 204 of conveyor belt 148 is supported between its head and tail pulleys by intermediate pulleys 206, 208, 210, and 212. See FIGS. 2 and 3. Each pulley 206, 210, and 212 is supported on a shaft 214 rotatably journaled in bearings 216 fastened to the outsides of stringers 94, 100.

Pulley 208 is part of the automatic belt tensioning means 180. It is fast on a shaft 218 rotatably journaled at opposite ends within the bearing blocks 188. As clearly shown in FIGS. 2 and 3, the return run 204 includes a bight 205 trained under pulley 208. This bight is biased downward in an enlarging direction, by the above-described springs 194, 194, to tension the conveyor belt 148.

The head or driving pulley 150 preferably has a resilient, rubberlike cover 151 to eliminate slippage, especially under heavy loads. Under the tension applied by the automatic tensioning means 180, the screen mesh of which the conveyor belt 148 is made indents the rubberlike cover to provide a very effective friction drive.

As shown in FIG. 7, input conveyor 222 and output conveyor means 224 are disposed at right angles to the main conveyor 46. (As will be seen, the output conveyor means 224 comprises two, parallel, commonly driven conveyors 258, 260.) The upper, conveying surfaces of all conveyors are in the same horizontal plane to facilitate the transfer of bottles and cans from one to the other, without tipping.

Refer to FIGS. 2, 4, 7, and 8. Input conveyor 222 has an elongated, box section frame 221 comprising two side members 226, 226, each having inwardly extending upper and lower flanges 228 and 230. Conveyor 222 includes an endless belt 232 which is here shown as a series of pivotally interconnected metal plates 234. The belt 232 is trained for orbital movement about conveyor sprockets 236, 238 (FIG. 4), which are mounted respectively on shafts 237, 239 journaled in the box section sidewalls 226, 226. Sprocket 238 is a drive sprocket. It is driven by a driving train including a driving chain sprocket 240 on shaft 239, a chain 242, and a driving chain sprocket 244 on output shaft 247 of variable speed transmission 246 which is driven by motor 248.

The input conveyor upper run 249 moves along in a horizontal path on a slideway provided by the upper flanges 228. The return run 251 rides on lower flanges 230.

An important part of the invention is the arrangement for maintaining the conveying surface of the upper run 249 in precisely the same plane as that of the main conveyor upper run 196. This is shown in FIG. 8. Frame side members 226 are tied together by a bottom, transverse bar 250 spaced above each of the frame members 138, 140. A pair of transversely spaced, threaded, adjustment rods 252 depend from the bottom of each bar 250. They extend through apertures in members 138 and 140. By suitable adjustment of nuts 256, the input conveyor can be leveled and tilted in any direction needed to place its conveying run precisely in the same plane as that of the main conveyor belt 148.

As shown in FIGS. 5 and 7, the output conveyor means 224 consists of two parallel conveyors 258 and 260, co-planar with the main conveyor 46, and at right angles to it. Conveyor 258 moves at about half the speed of conveyor 260. This avoids tipping bottles and cans when they transfer from conveyor 46. The output conveyors are endless, orbitally movable, pivoted plate conveyors, as described above for the input conveyor 222. Both output conveyors 258, 260 are supported in a frame generally designated 262 (FIG. 2). This frame is substantially similar to frame 221 (FIG. 8) except that it has two box sections 263 and 265 for the two conveyors 258 and 260 respectively, supported on common cross-bars 267. Frame 262 is adjustable for both tilt and level, in the same manner as described in connection with the input conveyor frame 221, by means of vertical adjusting screws 264 supported on main frame members 142 and 144.

The inbye ends of both output conveyors 258 and 260 are trained about a common idler sprocket 266 (FIGS. 5 and 7) which is rotatably journaled in the frame 262. The outbye ends of output conveyors 258 and 260, are trained about separate sprockets 268 and 270, respectively.

As shown in FIG. 7, a motor 272 drives the output conveyors, concurrently, as follows: A chain driving sprocket 274 on the motor shaft 275 is connected through drive chain 276 to chain-driven sprocket 278 and drives a shaft 280 which carries the conveyor sprocket 270. This drives the longer, faster conveyor 260 at a predetermined speed. Conveyor 258 is driven through chain 282 and chain sprockets 284 and 286, mounted, respectively, on shafts 280 and 288. The latter reaches through between the runs of conveyor 260 and rotates conveyor sprocket 268 at a speed determined by the ratio between chain sprockets 284 and 286.

In practice, this sprocket ratio is approximately 2 to 1, enabling conveyor 258 to move at about one-half the lineal speed of conveyor 260.

As shown in FIGS. 7 and 8, guide rails 290, 292, and 294 are provided alongside the conveyors to guide bottles or cans to, and through, the novel heating and drying apparatus. These guide rails are held in place by brackets 296 fastened to the frame members as shown.

It will be understood that the particular kinds of conveyors or guide rails shown are not essential to practice of the invention, but, as will be described, it is important that the main conveyor be foraminous, at least in the third heat zone 40, so the containers can be sprayed with hot liquid from below.

As shown on the flow sheet, FIG. 1, the drip pan liquid dispensing means in the upper compartment 32 are designated generally by the numbers 50 and 52. These are overhead drip pans which handle warm and hot water, respectively.

Drip pan means 50 comprises, in the present instance, a single pan. Drip pan means 52, as shown in the detailed drawings, comprises three pans, primarily for the ease of handling three small pans instead of one large pan. The pans in group 52 are designated 300, 302, and 304. It is important that the drip pans be easily removable for cleaning.

Figure 9:
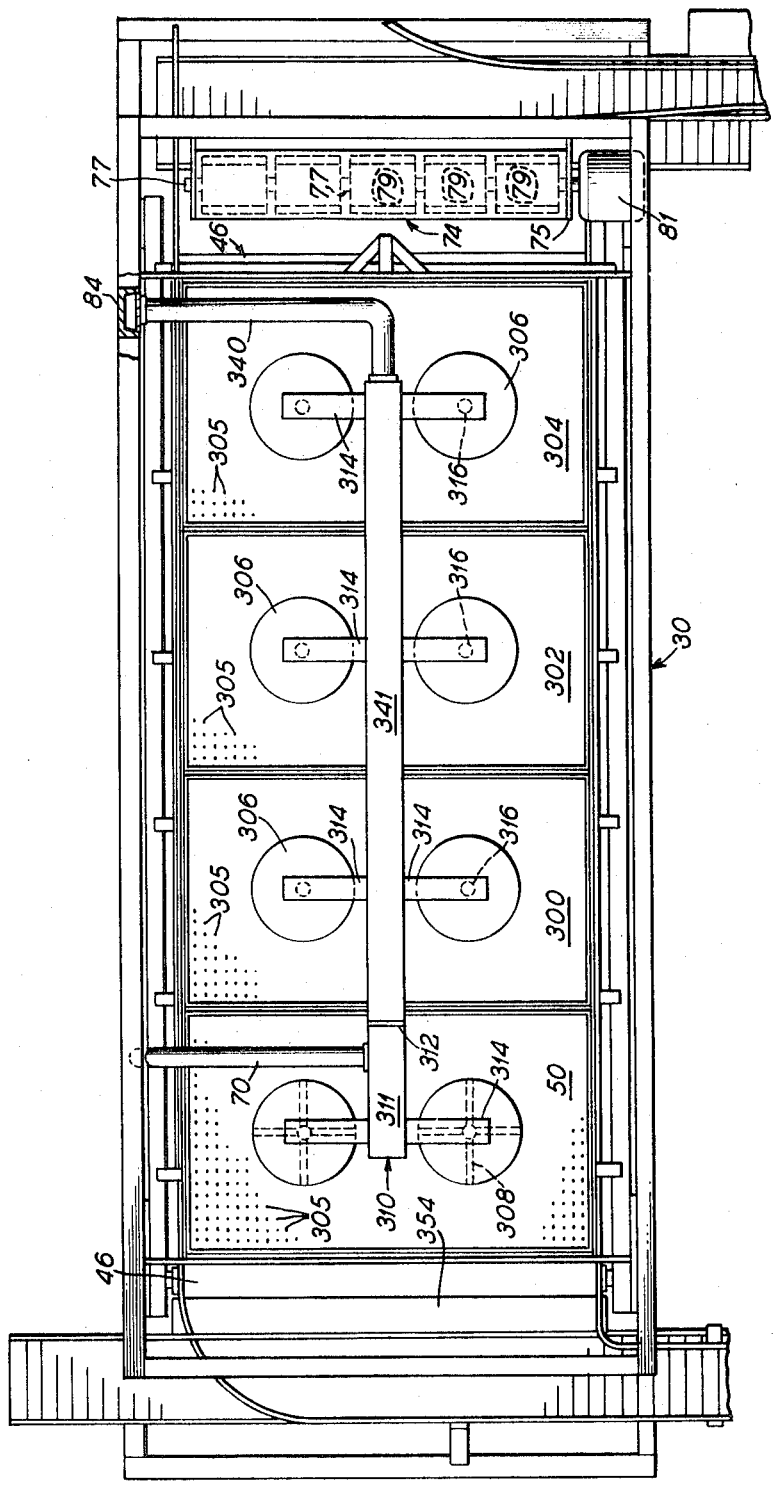
FIG. 9 is a top, plan view of the apparatus shown in FIG. 2, taken in the direction of arrows 9—9.

Longitudinal angle members 298, end-supported by struts 131 and 135 (FIGS. 4 and 5), support drip pans 50, 300, 302, and 304. Each pan is rectangular and has a perforated bottom with openings 305 (FIG. 9). Each has a pair of upwardly convex deflector cones 306 mounted above the bottom of the pan by crossed, vertical plates 308.

As best shown in FIG. 9, a manifold 310 is supported above the drip pans, and extends lengthwise of the main conveyor 46. This may be supported in any suitable way, by the housing, or by the connecting piping to be described. The manifold is a square cross-section, closed, liquid conduit, with opposite end portions 311 and 341 separated by a wall 312. Pairs of transverse conduits 314 extend armlike from the manifold 310, at intervals, each having a downwardly facing nozzle 316 aligned with the center of a cone 306. Water pouring over the cones from the nozzles 316 is distributed uniformly, with a minimum of turbulence and foaming, over the apertured bottoms of the drip pans.

Spray means (generally designated 54 in the flow sheet, FIG. 1), is directed upwardly through the upper run 196 of the screen conveyor belt 148 in the third heat zone 40. This comprises eight or more transverse pipes 320 (FIG. 7), supported between the upper and lower runs 196 and 204 of the main conveyor belt 148. Each spray pipe 320 has a series of upper apertures 322, through which hot water is dispersed. The spray pipes are interconnected at one side of the apparatus by a manifold pipe 324 (FIG. 7).

Tank 56 and drain pans 58, 58, are positionsed to collect all the water that drips or falls from the containers, so that it can be reused. This conserves water, and heat. The recirculation system to accomplish this will now be described.

The heater 66 may be any high-capacity liquid heating unit capable of heating water in a single pass. As an example, the heater disclosed in co-pending application Ser. No. 20,811, filed Apr. 15, 1970, titled Instantaneous Sanitizing Water Heater Unit, and assigned to this same assignee, has been used effectively with the present invention.

The water in the tank 56, after draining from the cold containers, may be in the order of 110° to 115° Fahrenheit. This water, without reheating, is pumped through line 70 into manifold section 311, and thence through nozzles 316 over the deflector cones in drip pan 50. The water then rains down through the apertures 305 in pan 50. This begins to heat the cold containers but the water is sufficiently tempered that it does not crack bottles or distort cans or adversely affect them. The volume of water introduced in this first heat zone is regulated by the valve 330.

The pump 60 is driven by a motor 332. Water is drawn in from the tank 56, through line 62, past union 61, into pump 60, then out line 64, past union 53 (FIG. 5), and into tee 55 where the pump output is divided, part being bypassed upward through line 70 as determined by the setting of regulator valve 330, and the remainder passing through line 68. It exits from the housing 30 at port 334 (FIG. 3), passes through heater 66 (FIG. 1), and re-enters the housing through port 336 (FIG. 3).

As shown in FIGS. 7 and 9, the inner side of upright channel 84 is closed to provide a rectangular cross-section conduit which serves the dual function of supporting the frame and conveying hot water. The port 336 (FIG. 3) is at the bottom of this channel. Hot water at 140° Fahrenheit, or more, flows up the channel, through outlet line 338 (FIG. 7), into manifold pipe 324 and thence into the eight under-spray pipes 320.

At the top of the channel 84, as shown in FIG. 9, hot water flows through an outlet pipe 340 into the hot water end portion 341 of manifold 310. Hot water then flows from nozzles 316 and over the deflector cones 306 in drip pans 300, 302, and 304. This occurs throughout the second and third heat zones 38 and 40.

The blower 74 is supported on the horizontal struts 118, 120 above the conveyor 46 in the unloading zone 44, at the conveyor outbye end. The blower has a nozzle 342 which is adjustable to blow downward at a desired angle upon the tops of the containers 48. The containers may either be bottles, as shown, or cans. As shown in FIG. 9, the blower 74 is preferably as wide as the main conveyor 46. The nozzle 342 is preferably as wide as the conveyor 46 so it will force a wide, high-velocity ribbon of air across the entire width of the conveyor, and dislodge drops of moisture which would cling to the containers. This is especially useful in blowing off water which is trapped in the top rings of cans. As shown in FIG. 9, the blower 74 includes an enclosing body 75 which extends transversely of the main frame 30. A long shaft 77 is journaled for rotation within the body and it has a series of impellers 79 mounted on it. Alternatively, a single, long impeller might be used. A motor 81 rotates the shaft to draw air into the inlet 352 and discharge it from outlet nozzle 342.

The air from blower 74 follows a closed path. As shown in FIGS. 2 and 3, it blows backward, counter-current to the conveyor movement, through a passage 348 between the drip pans 50, 300, 302, 304 and the conveyor 46, and then flows forward through a parallel passage 350 between the drip pans and top of the casing 30, to the blower inlet 352. This is a substantially closed circuit, indicated by arrows in FIGS. 1, 2 and 3.

An advantage of recycling air, as contrasted with using fresh outside air, is that the air is heated, therefore will not appreciably cool the warm and hot water in the heat zones; and, by using the same air over and over again, heat energy is conserved, and no hot, humid air is discharged into the working area around the apparatus.

As shown in FIGS. 2 and 3, vertical air deflector plates 351 and 353, supported at opposite ends of the apparatus, guide the air flow in the closed circuit described.

In operation, containers 48, which may be either bottles or cans, will be loaded onto the input conveyor 222 in any suitable manner, either by hand or from an upstream bottling or canning operation. As they are conveyed into the casing 30, they will make a right-hand turn, guided by the railing 290 (FIG. 7), and pass over the narrow plate 354 which bridges the gap between the input conveyor 222 and the main conveyor 46 which is substantially wider than the input conveyor 222 so a dozen or more containers may move abreast along the main conveyor.

The containers, which enter at approximately 40° Fahrenheit, will be sprayed by warm water raining down from drip pan 50 in the first heat zone 36.

Next, the containers will be sprayed by hot water raining down from drip pans 300, 302, and 304 in the second and third heat zones 38 and 40.

In the third heat zone 40, the containers will additionally be sprayed from beneath by hot water from the underspray pipes 320. This will bring them quickly up to the final temperature desired, well above the dew-point of the ambient air. Generally, a temperature of 80° will suffice to produce dry, moisture-free containers at the unloading end of the main conveyor 46. Conveyor 46 pushes them across a second bridge plate 356, onto the output conveyor means 224. Containers will first move onto the relatively slow moving conveyor 258, and then onto faster conveyor 260 which will convey them in substantially single file out of the cabinet 30 to a subsequent operation where they may be labeled or cartoned, or stored.

If one of the output conveyors 258 or 260 malfunctions, the containers may continue feeding across it by the pressure of those behind on conveyor 46. In such event, a jam-up cable 358 is stretched across the end of the unloading zone, as shown in FIG. 7. The cable is trained about a sheave 360 to a kickout switch 362 which will stop all conveyors until the malfunction is corrected.

Although the apparatus is illustrated with first, second and third heat zones in a specific contiguous relationship, it should be understood that they need not be contiguous, that other heat zones or treatment zones may be interposed between them, or added to make a total of more than three heat or treatment zones.

We claim as our invention:

1. Apparatus for heating and drying chilled, filled containers comprising:
   an enclosed housing having upper and lower compartments;
   said upper compartment having first, second and third heat zones successively disposed along a predetermined path between loading and unloading zones;
   a main conveyor extending along said path and adapted successively to move containers from said loading zone through said heat zones and to said unloading zone, said conveyor being foraminous in at least said third heat zone to enable liquid to flow through from the underside;
   downwardly directed liquid dispensing means above said conveyor in each of said three heat zones, and positioned to direct liquid downwardly toward containers on said conveyor;
   upwardly directed liquid dispensing means beneath said conveyor in said third heat zone, and positioned to direct liquid upwardly through said conveyor toward containers on said conveyor;
   a tank in said lower compartment adapted to store liquid for reuse;
   guide means within said housing adapted to collect liquid dispensed by said dispensing means, and direct it into said tank;
   a pump having its inlet connected with said tank;
   a pump outlet conduit adapted to connect the outlet of said pump with a liquid heater to reheat a portion of the liquid from said tank, for reuse, hot, in said second and third heat zones;
   a bypass conduit connecting said pump output conduit with said liquid dispensing means in said first heat zone to dispense warm liquid at substantially the temperature of liquid in said tank over containers in said first heat zone; and
   a heater output conduit adapted to connect the outlet of a heater with said downwardly directed liquid dispensing means in said second and third heat zones, and with said upwardly directed liquid dispensing means in said third heat zone to dispense hot liquid over containers in said second and third heat zones and on the undersides of containers in said third heat zone.

2. Apparatus according to claim 1, in which an air blower is mounted above said conveyor beyond said third heat zone and said blower has an outlet port directed downward to dislodge liquid from containers carried by said conveyor.

3. Apparatus according to claim 2, in which said upper compartment is divided by horizontal separator means into two parallel, air-conducting passages, one of said passages providing space through which containers are moved by said conveyor, said passages being interconnected adjacent said loading and unloading zones to provide a substantially closed circuit for the flow of air from said blower, whereby air output from said blower is directed along containers in said one passage and is returned to said blower through the other of said passages.

4. Apparatus according to claim 3, in which air output from said blower moves in said one passage counter-current to the direction of movement of containers.

5. Apparatus according to claim 3, in which said horizontal separator means comprises said downwardly directed liquid dispensing means above said conveyor in said three heat zones, whereby warm and hot liquid raining down through said one passage is effective to contact and heat air passing through said one passage before said air is returned to said blower.

6. Apparatus according to claim 1, in which said downwardly directed liquid dispensing means comprises drip pan means disposed above and parallel to said main conveyor.

7. Apparatus according to claim 6, in which said guide means adapted to collect liquid includes liquid drain pan means, and said drain and drip pan means are removable from the housing for cleaning.

8. Apparatus according to claim 1, in which said liquid dispensing means in said first heat zone is separate from and independent of said liquid dispensing means in said second and third heat zones to maintain separation above said conveyor between warm liquid dispensed in said first heat zone and hot liquid dispensed in said second and third heat zones.

9. Apparatus according to claim 1, in which said main conveyor is an endless screen trained for orbital movement between pulleys, one of said pulleys being a drive pulley having an indentable, resilient rubberlike cover to maintain frictional driving engagement with said screen when the latter is tensioned within a predetermined range, said screen having automatic tensioning means including a bight in the return run of said screen, spring means effective to urge said bight in an enlarging direction, and means for adjusting the urgence of said spring means against said bight to maintain tension in said screen within said predetermined range throughout normal service temperature fluctuations.

10. Apparatus according to claim 1, in which said guide means for collecting liquid comprises at least one drain pan, wider than said main conveyor, said drain pan being inclined downwardly toward said tank at an angle enabling it to be self-cleaning.

11. Apparatus according to claim 1, in which said liquid dispensing means in each heat zone is a perforated drip pan and liquid is directed into each said drip pan over the apex of an upwardly convex deflector cone to provide uniform dispensing of liquid through perforations in said drip pans.

12. Apparatus according to claim 1, including input conveyor means extending into said loading zone and effective to move containers into said loading zone, and output conveyor means extending from said unloading zone and effective to move containers out of said unloading zone.

13. Apparatus according to claim 12, in which said output conveyor means includes at least two conveyors transversely disposed relative to said main conveyor and driven at progressively increasing lineal speeds to enable change of direction of containers and transfer from said main conveyor to said output conveyor means while remaining in an upright position.

14. Apparatus according to claim 12 in which at least one of said conveyor means is an endless conveyor which is orbitally movable about an elongated frame and said frame is mounted on said housing by a pair of transversely spaced supporting and adjusting screws at each end of said frame, whereby the height and tilt of said conveyor means is adjustable relative to said main conveyor to maintain the container-conveying surfaces thereof in the same generally horizontal plane.

* * * * *